US012809158B2

(12) United States Patent
Pashkovsky

(10) Patent No.: US 12,809,158 B2
(45) Date of Patent: Nov. 24, 2026

(54) METHOD FOR ENSURING THE OPERATION OF A TELESCOPE AND DEVICE FOR CARRYING OUT SAID METHOD

(71) Applicant: Vladimir Eliich Pashkovsky, St. Petersburg (RU)

(72) Inventor: Vladimir Eliich Pashkovsky, St. Petersburg (RU)

( * ) Notice: Subject to any disclaimer, the term of this patent is extended or adjusted under 35 U.S.C. 154(b) by 200 days.

(21) Appl. No.: 18/839,874

(22) PCT Filed: Feb. 15, 2023

(86) PCT No.: PCT/RU2023/050027

§ 371 (c)(1),
(2) Date: Aug. 20, 2024

(87) PCT Pub. No.: WO2023/163617

PCT Pub. Date: Aug. 31, 2023

(65) Prior Publication Data

US 2025/0155698 A1 May 15, 2025

(30) Foreign Application Priority Data

Feb. 23, 2022 (RU) ................................ 2022104744

(51) Int. Cl.
*G02B 23/12* (2006.01)

(52) U.S. Cl.
CPC .................................... *G02B 23/12* (2013.01)

(58) Field of Classification Search
CPC .................................. G02B 23/12; B64G 3/00
See application file for complete search history.

(56) References Cited

FOREIGN PATENT DOCUMENTS

| | | | |
|---|---|---|---|
| CA | 2050520 A1 | | 3/1993 |
| JP | 2708667 B2 | * | 2/1998 |
| RU | 2751989 C1 | | 7/2021 |
| RU | 2754303 C1 | | 8/2021 |

OTHER PUBLICATIONS

JP-2708667-B2, translation (Year: 1998).*
Search Report in PCT/RU2023/050027, dated Sep. 13, 2023.
Bradley E. Schaefer, Glare and Celestial Visibility, Publications 1-8 of the Astronomical Society of the Pacific, 103, 645-660, abstract (1991).

* cited by examiner

*Primary Examiner* — Wen Huang
(74) *Attorney, Agent, or Firm* — Bardmesser Law Group

(57) ABSTRACT

Method for supporting operation of a telescope in presence of bright, fast-moving objects, and a device for carrying out the method. When telescope is in operation, its orientation toward a field of observation is determined; an optical observation device is mounted in vicinity of the telescope, the device having field of observation with radius 1-10 degrees larger than field of observation of the telescope; optical observation device is oriented toward field of observation of the telescope; and bright objects are registered and direction and speed of movement thereof are determined. Objects having a speed and direction of movement indicating they are stars are identified, and this data is used for guiding the telescope and optical observation device. Artificial space objects and flying objects are identified, their parameters are determined and used for protecting the results of telescope observations from optical radiation from bright, fast-moving objects, mitigating those effects.

19 Claims, 5 Drawing Sheets

METHOD FOR ENSURING THE OPERATION OF A TELESCOPE AND DEVICE FOR CARRYING OUT SAID METHOD

TECHNICAL FIELD

The present invention relates generally to optical astronomy and, more particularly, to ensuring operation of telescopes in the presence of bright, fast-moving objects within a field of observation.

CONVENTIONAL ART

Astronomical observations in the optical range are at risk of exposure to bright, fast-moving objects. Most commonly, these objects are low-orbit satellites, which are especially visible in the night sky near the beginning and end of the night. Such objects may appear in different portions of the optical range, primarily in the visible and infrared ranges. They may also include aircraft equipped with signal lights, meteors, space or aerial objects of unknown origin, and similar objects.

Bright satellites create interference not only for observations from Earth, but also for observations conducted by telescopes placed in space. When such satellites pass in front of a space-based telescope, they leave traces in the form of long lines of considerable width on telescope images. This exposure may be particularly significant when a bright satellite passes in front of a space-based telescope at a short distance.

Images of bright satellites are not only present in images of the starry sky captured by ground-based and space-based telescopes. They may also appear in images captured by guiding cameras that form part of telescope guiding systems. This makes it difficult to track guide stars and introduces additional distortions into astronomical observations by reducing the accuracy of the guiding system.

Accordingly, there remains a need for a solution that protects both astronomical observations and telescope guiding processes from the effects of bright, fast-moving objects, such as satellites and aircraft.

Astronomical systems are known that include a telescope and a guiding system for automatically guiding the telescope toward an observation region as Earth rotates. One example is WO2015100738, published Jul. 9, 2015, IPC G01C 21/02, which describes an automatic astronomical observation system comprising an astronomical telescope, a celestial-guidance servomotor for controlling the astronomical telescope, and a control system.

An automatic method of astronomical observation is also provided. When the system and method are used, automatic initial detection, automatic focusing, and image storage are performed. Automatic astronomical observation can be implemented, an automatic initial detection process may be carried out without calibration, and rapid automatic focusing may be adaptively achieved, thereby satisfying the need for observation, storage, and exchange of celestial images.

Methods and devices are also known for protecting telescope operation from bright moving objects when observing faint objects.

Long Exposure Image Capture Apparatus, RU2717252, published Mar. 19, 2020, IPC G03B 7/08, enables images of the starry sky to be captured at long exposures under the influence of short-term optical interference from low-orbit satellites. The protection method provides for use of an additional shutter that interrupts arrival of the image on the matrix during the presence of a disturbance in the field of view, based on a command from a disturbance detector.

Patent EP3671280, published Apr. 7, 2021, IPC B64G 3/00, describes a method for determining the exact position of a moving object at any given time. The system implementing the method includes a telescope, a satellite positioning system, and an electronic processor. The telescope includes focusing optics, a mechanical shutter, and a CCD sensor that performs Time Delay and Integration. When the moving object passes through the telescope's field of view while the mechanical shutter is open, the shifting of pixel charge in lines of the CCD sensor is performed at least once, thereby displacing the trace of light left by the image of the moving object along a column of pixels.

The closest equivalent is RU2754303, published Aug. 31, 2021, IPC G02B 23/00. This patent discloses a method for reducing the effect of interference when imaging faint objects. Coordinates of the field of observation of the faint object, corresponding to the portion of the photodetector matrix on which the projection of the captured low-luminous object is located, are determined, as is the time for recording observation results of the captured low-luminous object. Based on signals regarding trajectories of optical interference sources, the time during which projections of the optical interference sources are present in the observation field of the faint object is determined, and arrival of the optical signal is blocked while the projections are present in the observation field of the faint object.

Satellite-motion trajectory data may be derived from a space-object trajectory database, such as NORAD, from various Space Situational Awareness (SSA) services, or from aerial-object tracking services.

However, the error in such data may be significant, and the data typically do not include accurate information regarding object brightness. This is because the brightness of a moving object may change during movement, for example when the object exits Earth's shadow, rotates about its axis, approaches another object so that the brightness of the combined objects increases, activates signal lights, switches on an optical communication transmitter, or for other reasons.

In this context, brightness is the main parameter that determines the level of negative impact of the object on astronomical observations.

Examples of protecting telescope guiding systems from interference caused by bright, fast-moving objects are not known.

SUMMARY OF THE INVENTION

A technical result achieved by embodiments of the invention is increased operating efficiency of a ground-based or space-based telescope by reducing the effect of optical radiation from bright, fast-moving objects on operation of a guiding system and on observations performed by at least one telescope.

According to an embodiment, a method for ensuring operation of a telescope in the presence of bright, fast-moving objects includes determining a direction of a field of observation of the telescope; installing an optical observation device at or near the telescope, the optical observation device having a field-of-observation radius that is greater than a radius of the field of observation of the telescope by one to ten degrees; and directing the optical observation device toward the field of observation of the telescope. Bright objects are registered at an output of the optical observation device, and a speed and a direction of movement of the bright objects are determined. Among the registered bright objects, objects whose speed and direction of movement indicate that the objects belong to a class of stars are identified, and data relating to the identified stars are used to guide the telescope and the optical observation device. Objects whose speed and direction of movement indicate that the objects belong to a class of space objects or flying objects of artificial origin are also identified, parameters of those objects are determined, and the determined parameters are used to protect at least one telescope from an effect of optical radiation from bright, fast-moving objects on observation results.

Thus, the technical result is achieved as follows.

In embodiments, only objects belonging to the class of stars are selected for guiding the telescope and the optical observation device, thereby reducing or eliminating the effect of bright, fast-moving objects on determining positions of stars used as guide stars during guiding. Accordingly, movement of the telescope and the optical observation device following movement of the celestial sphere may be made more accurate and less susceptible to shifts caused by interference from bright, fast-moving objects.

Parameters of bright, fast-moving objects entering the field of observation of the optical observation device may be used to eliminate or reduce an impact of such objects on the photodetector matrix of the telescope and to reduce a negative impact on observation results.

In addition, synchronous movement of the telescope and the optical observation device following movement of the celestial sphere, based on star-motion data obtained by the optical observation device, may protect observation results of the telescope from the effect of bright, fast-moving objects with greater efficiency. In such embodiments, the apparent speed and direction of movement of the bright, fast-moving objects in the field of observation of the telescope and in the field of observation of the optical observation device are substantially the same. Accordingly, parameters of these objects determined by the optical observation device may have the required accuracy.

Thus, the method and device may address both guiding-system protection and observation-result protection using a common optical observation device.

In some embodiments, the optical observation device is mounted on the telescope.

In some embodiments, the method further includes determining a location of the optical observation device and transmitting location data to one or more telescopes together with parameters of registered space objects and flying objects of artificial origin.

In some embodiments, a distance from the optical observation device to the telescope does not exceed 300 to 500 meters.

If the distance is exceeded, parallax may significantly displace a projection of fast-moving space objects located less than 500 km away in the field of observation of the telescope relative to a projection of the same objects in the field of observation of the optical observation device. As a result, parameters of bright, fast-moving objects may be determined by the optical observation device with insufficient accuracy.

Apparent brightness of fast-moving objects is determined by mutual orientation of their reflective surfaces, the observer, and the Sun. Therefore, increasing the distance from the telescope to the optical observation device, and the associated change in angle of observation of the objects, may change their apparent brightness. Accordingly, increasing the distance between the telescope and the optical observation device beyond 500 meters may reduce efficiency of the method.

In some embodiments, the telescope is a space-based telescope.

According to another embodiment, a device for implementing the method comprises a bright-object parameter-determining unit, a guiding unit, and a bright fast-moving object parameter-determining unit. An output of the bright-object parameter-determining unit is connected to an input of the guiding unit and to an input of the bright fast-moving object parameter-determining unit. An input of the bright-object parameter-determining unit is configured to be connected to an output of the optical observation device, the optical observation device having a field-of-observation radius that is greater than a radius of the telescope's field of observation by one to ten degrees. An output of the guiding unit is configured to be connected to a telescope guiding device. An output of the bright fast-moving object parameter-determining unit is configured to be connected to an input of at least one device for reducing an effect of bright, fast-moving objects on observation results of at least one telescope.

The method and device described herein may protect both operation of a guiding system and astronomical observations performed with ground-based or space-based telescopes from influence of bright objects.

The technical result described above with respect to the method may also be achieved by the device.

In some embodiments, the device further comprises a spatial location sensor.

In some embodiments, the device is configured to connect to databases of space objects and flying objects.

TERMS AND DEFINITIONS

As used herein, the following terms have the meanings set forth below.

A "matrix of the photodetector of a telescope" refers to a single photosensitive matrix or an array of photosensitive matrices configured to capture an optical signal arriving from an optical system of the telescope at the photodetector.

A "matrix of the photodetector of an optical observation device" refers to a photosensitive matrix configured to capture an optical signal arriving from an optical system of the optical observation device at the photodetector.

A "telescope field of observation" refers to a field of a matrix of the photodetector of a telescope on which a projection of observed celestial space is present at a particular observation time.

An "optical-device field of observation" refers to a field of a matrix of the photodetector of an optical observation device on which a projection of celestial space is present, the field of observation having a radius greater than a radius of the telescope field of observation by one to ten degrees and being directed toward the telescope field of observation.

A "field of observation of the guiding unit" refers to a part of a field of a matrix of the photodetector of an optical observation device on which a projection of celestial space is present and which coincides with all or part of the telescope field of observation at a particular observation time.

A "radius of the field of observation" refers to a radius of a circle that surrounds a field of observation of a telescope or a field of observation of an optical observation device.

BRIEF DESCRIPTION OF THE ATTACHED FIGURES

The accompanying drawings, which are incorporated in and constitute a part of this specification, illustrate embodiments of the invention and, together with the description, serve to explain principles of the invention.

DETAILED DESCRIPTION OF EMBODIMENTS OF THE INVENTION

Reference will now be made in detail to exemplary embodiments of the present invention, examples of which are illustrated in the accompanying drawings. The described embodiments are provided by way of example and are not intended to limit the scope of the invention.

Figure 1:
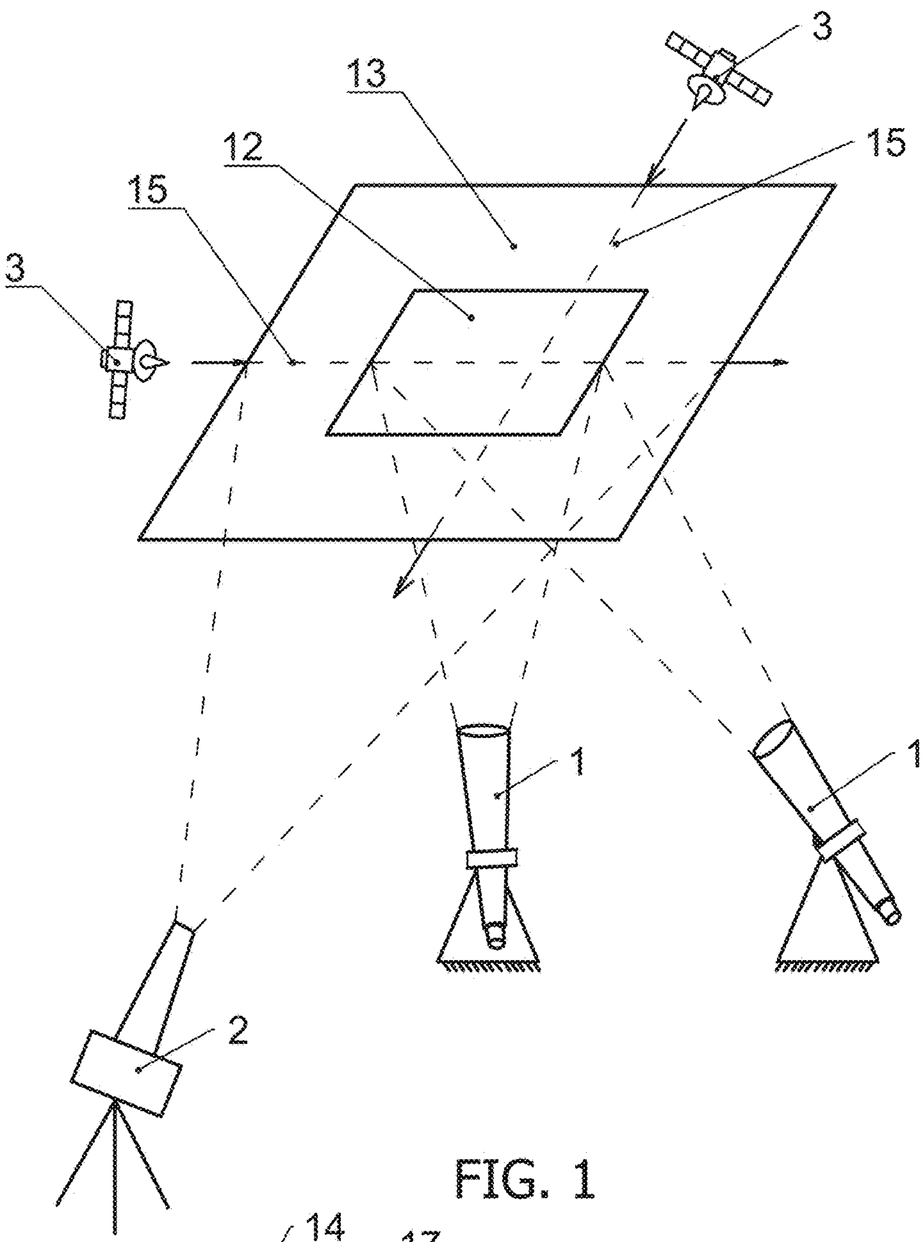
FIG. 1 is a diagram showing interaction between a telescope and an optical observation device.
Figure 4:
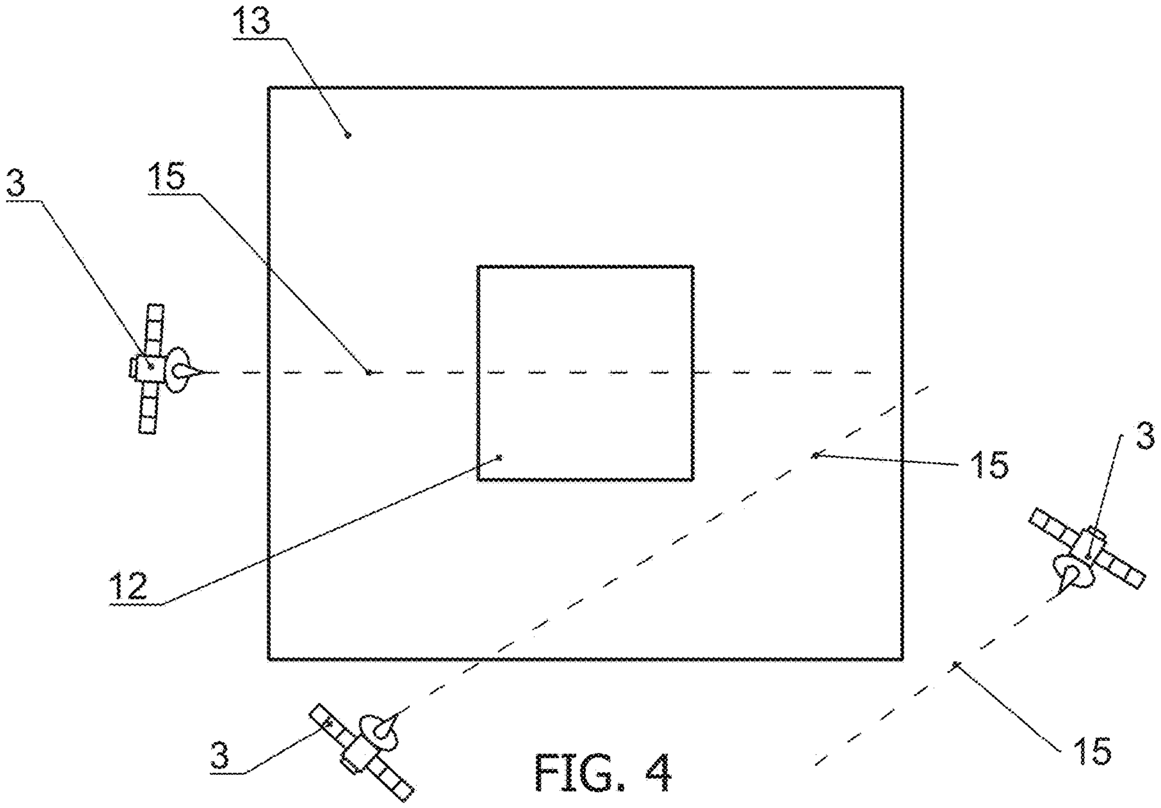
FIG. 4 shows a field of observation of the optical observation device with a rectangular matrix.
Figure 5:
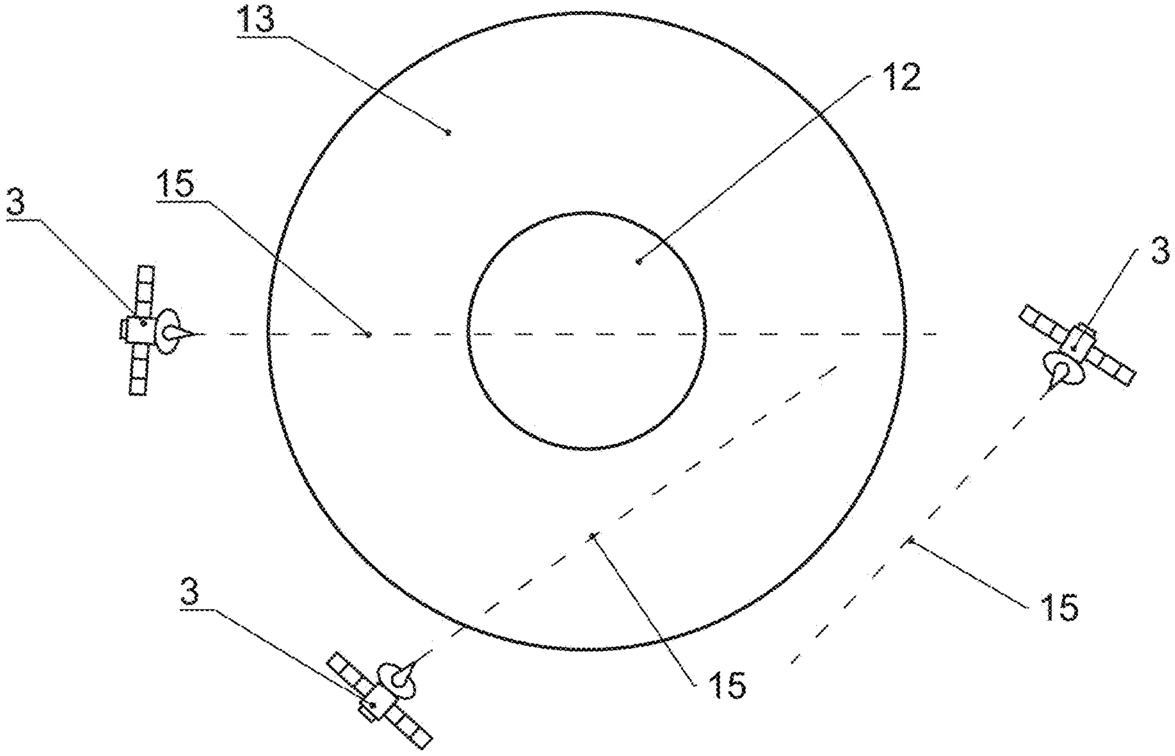
FIG. 5 shows a field of observation of the optical observation device with a circular matrix.

A method for ensuring operation of telescope 1 in the presence of bright, fast-moving objects 3 (FIG. 1) may be carried out using optical observation device 2. Initially, a direction of field 12 of observation of telescope 1 is determined. Optical observation device 2, having a radius of field 13 of observation greater than a radius of field 12 of observation of telescope 1 by one to ten degrees, is placed at or near telescope 1 and directed toward field 12 of observation of telescope 1. FIGS. 1, 4, and 5 show possible trajectories 15 of bright, fast-moving objects, such as satellites.

Field 12 of observation of telescope 1 (FIG. 4) may be rectangular or circular (FIG. 5). Depending on the shape of field 12, field 13 of observation of optical observation device 2 may likewise be rectangular or circular.

The method may enable operation of at least one telescope 1. Thus, the same optical observation device 2, when interacting with device 16 comprising unit 5 for determining parameters of bright objects, guiding unit 6, and unit 7 for determining parameters of bright, fast-moving objects (FIG. 6), may support operation of either one telescope 1 or a plurality of telescopes in the presence of bright, fast-moving objects 3.

In astronomical-observation practice, several telescopes 1 may simultaneously observe the same region of the stellar sky. Such telescopes 1 may be located near one another in a single observatory. They may also be in close proximity, for example during gatherings of amateur astronomers at a single site to observe rare astronomical phenomena. In such situations, an impact exerted by a bright satellite 3 or aircraft on observations carried out by one telescope may also be exerted on observations carried out by neighboring telescopes 1. The method may reduce or eliminate this impact.

Figure 7:
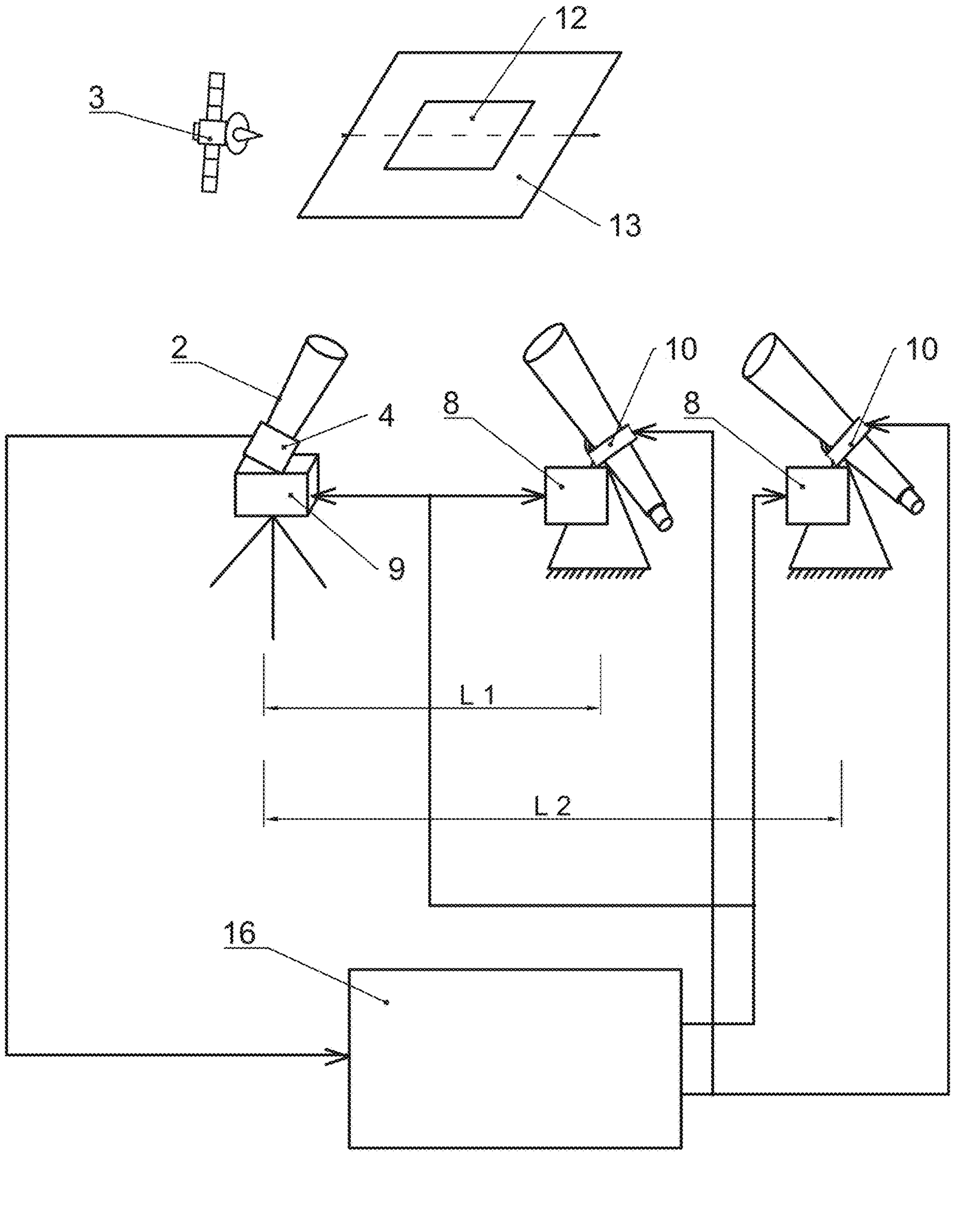
FIG. 7 shows a diagram of an embodiment of the method with multiple telescopes.
Figure 8:
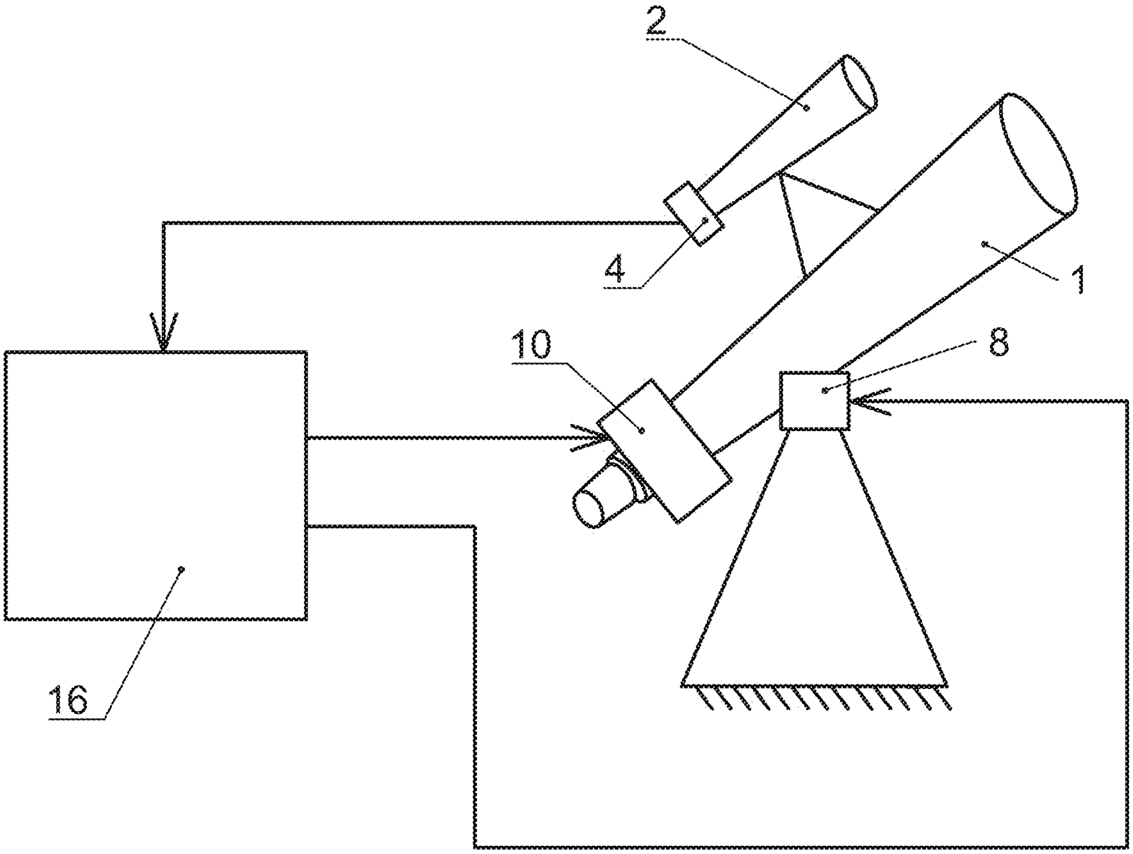
FIG. 8 shows a diagram of mounting an optical observation device on a telescope.

Optical observation device 2 may be mounted directly on telescope 1 (FIG. 8). In this configuration, parallax that may occur when transitioning from field 12 of observation of telescope 1 to field 13 of observation of optical observation device 2 is substantially absent. If optical observation device 2 and telescopes 1 are spaced apart from one another (FIGS. 1 and 7), the resulting parallax may introduce error in protecting observation results from bright, fast-moving objects.

Figure 6:
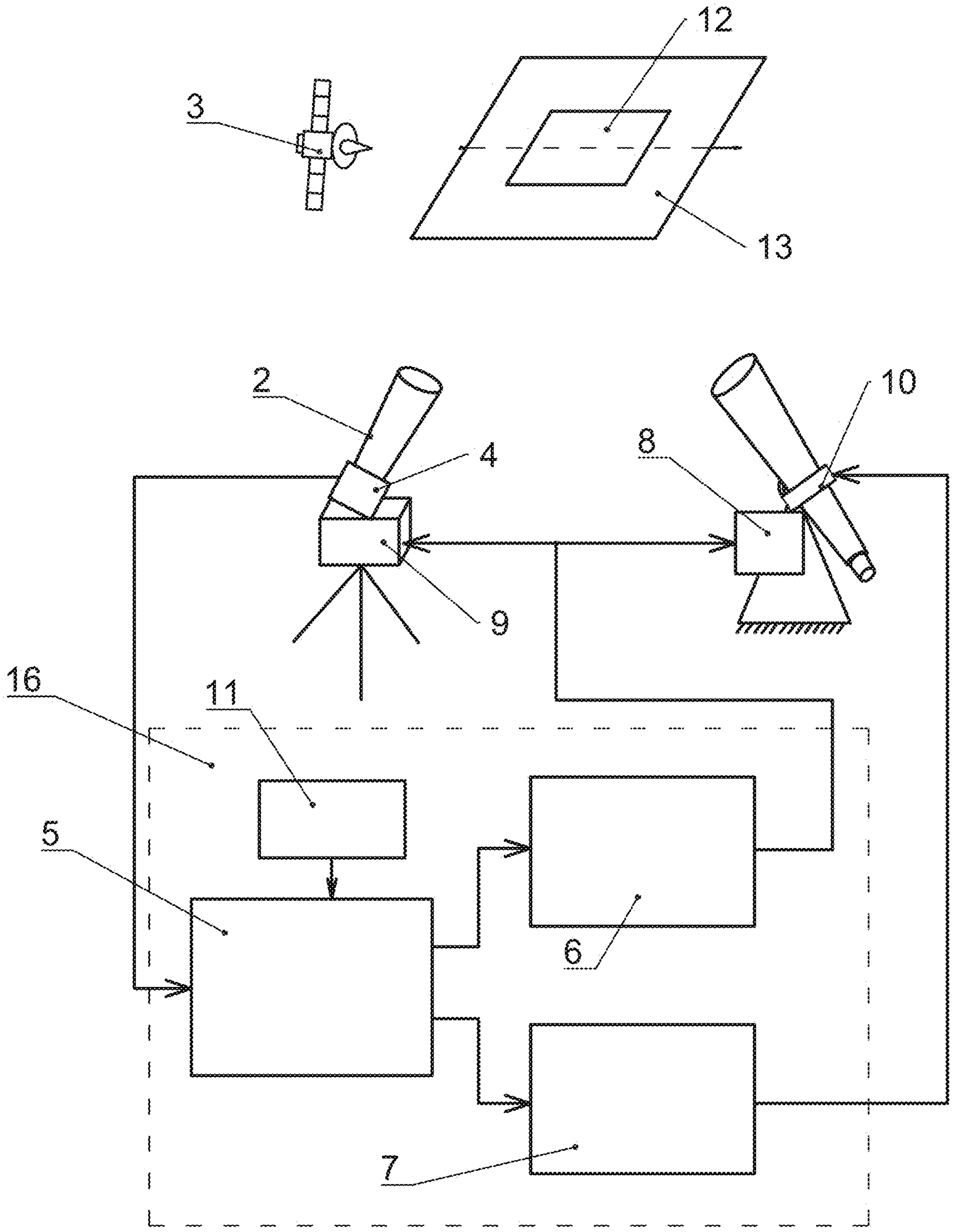
FIG. 6 shows a block diagram of an embodiment of the method.

FIG. 7 shows that distances L1 and L2 from optical observation device 2 to telescopes 1 should not exceed 500 meters in some embodiments. To monitor a position of optical observation device 2 when implementing the method, spatial location sensor 11, such as a GPS sensor (FIG. 6), may be introduced into device 16 to monitor a distance between optical observation device 2 and telescopes 1 connected to a system configured to protect against bright, fast-moving objects.

Optical observation device 2 (FIG. 6) comprises image formation unit 4 having a radius of field 13 of observation greater than a radius of field 12 of observation of telescope 1 by one to ten degrees. An output of image formation unit 4 is connected to device 16, which implements the method and comprises unit 5 for determining parameters of bright objects. In unit 5, bright objects whose speed and direction of movement indicate that they belong to a class of stars are identified, and objects whose speed and direction of movement indicate that they belong to a class of space objects or flying objects are also selected.

An output of unit 5 for determining parameters of bright objects is connected to inputs of guiding unit 6 and unit 7 for determining parameters of bright, fast-moving objects.

Figure 3:
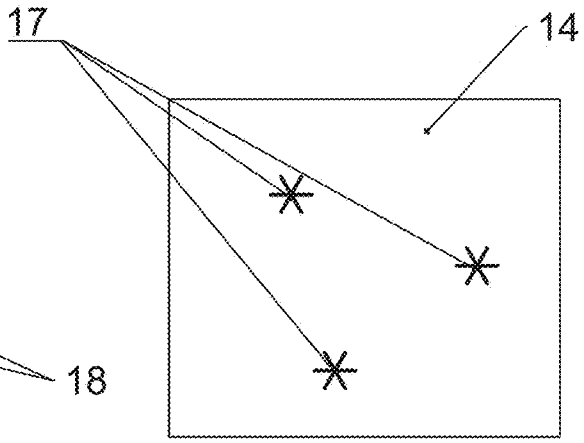
FIG. 3 shows the field of observation of the guiding unit when the method is applied.

In guiding unit 6, signals are generated for operation of guiding devices 8 of telescopes 1 by methods known for controlling guiding systems. To control guiding in guiding field 14 (FIGS. 3 and 4), only images of guide stars 17 are used, as shown in FIG. 3.

Figure 2:
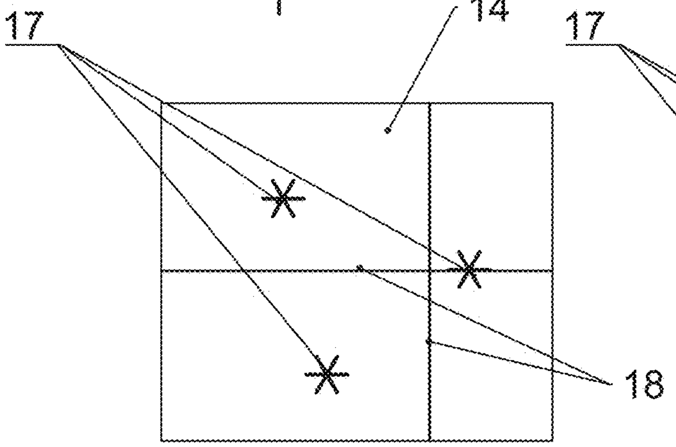
FIG. 2 shows a field of observation of the guiding unit without use of the method.

If parameters of bright, fast-moving objects were not determined in unit 5 and traces 18 of such objects were not removed from images transmitted to guiding unit 6, positions of stars 17 would be determined from the image illustrated in FIG. 2. This could lead to incorrect determination of positions of stars 17 at a given moment and to errors in commands of the guiding process.

If optical observation device 2 is not rigidly mounted on the telescope, optical observation device 2 may also be equipped with guiding device 9, which, like telescope guiding devices 8, is controlled by signals from guiding unit 6 (FIGS. 6 and 7).

In unit 7 for determining parameters of bright, fast-moving objects, brightness and movement parameters of those objects are determined. FIGS. 4 and 5 show field 12 of observation of telescope 1 and field 13 of observation of optical observation device 2. The centers of these fields may coincide. FIGS. 4 and 5 show traces of three bright, fast-moving objects 3, in this example satellites. One trace passes through field 12 of observation of telescope 1, a second trace passes through field 13 of observation of optical observation device 2 but does not enter field 12 of observation of telescope 1, and a third trace extends away from field 13 of observation of optical observation device 2.

The size of field 13 of observation of optical observation device 2 surrounding field 12 of observation of telescope 1 is selected based on the following parameters:

- expected angular velocity of the bright, fast-moving objects; at a high speed of such objects, the radius of field 13 of observation of optical observation device 2 should be selected to be larger, in order to capture several images of such an object;

frame rate at which optical observation device 2 operates; at a high frame rate, the radius of field 13 of observation of optical observation device 2 may be smaller, because the high frame rate enables the required number of frames to be obtained in less time, i.e., over a shorter distance traveled by bright, fast-moving object 3;

number of images needed to determine parameters of bright, fast-moving object 3, with at least two images for high-brightness objects and at least three images for medium- and low-brightness objects; if more images are needed, the radius of field 13 of observation of optical observation device 2 should be larger, and a larger number of images allows improved imaging of objects having insufficient or variable brightness;

exposure time of these frames, which makes it possible to obtain images of luminous objects on frames from which their speed and direction of movement can be determined with sufficient accuracy; longer exposure frames allow larger object-trace images to be obtained and parameters to be determined with greater accuracy, while the required time of object presence in the field of observation increases; for this reason, for images with longer exposure, the radius of field 13 of observation of optical observation device 2 should be selected to be larger;

duration of the interval between frames required to process frames and recognize images of bright, fast-moving objects 3 and stars 17 on the frames; a longer interval allows processing and recognition with greater accuracy, but also increases the time required for imaging, and therefore the radius of field 13 of observation of optical observation device 2 should be selected to be larger; and time required to actuate a device 10 of a type mounted on telescope 1 to reduce the effect of interference on observation results.

The combination of these requirements determines a minimum radius of field 13 of observation of optical observation device 2, which exceeds the radius of field 12 of observation of telescope 1 by one to ten degrees.

Increasing field 13 of observation may be undesirable. As shown in FIGS. 4 and 5, such an increase may increase the number of objects whose trajectories do not affect field 12 of observation of telescope 1 but, because they pass through field 13 of observation of optical observation device 2, are nevertheless processed in monitoring unit 5. This may increase processing time for parameters of all objects, cause processing delays, and increase error when determining direction and speed of bright, fast-moving objects passing through field 12 of observation of telescope 1.

To accurately determine motion parameters of satellites 3, a high-resolution optical observation device 2 may be used. For this reason, the radius of field 13 of observation of optical observation device 2 should not be excessive.

An excessive radius of field 13 of observation may also be undesirable because it can result in geometric distortions of the image.

The output of unit 7 for determining parameters of bright, fast-moving objects (FIG. 6) is connected to the input of at least one device 10 configured to reduce an effect of interference on observation results of at least one telescope 1. Device 10 may include, for example, a shutter or an optical filter configured to block a flow of light as bright, fast-moving objects pass through field 12 of observation of telescope 1. Interference may also be reduced by processing an astronomical image at the output of the photodetector matrix after observations, or by deactivating fragments of the photodetector matrix of the telescope during imaging. Interference may further be reduced by controlling an observation schedule, in which an observation start time is determined so that observations begin after bright, fast-moving objects exit field 12 of observation of telescope 1, and an observation termination time is determined so that observations terminate before bright, fast-moving objects enter field 12 of observation of telescope 1.

Control signals may be transmitted to a remote telescope 1 via one or more of wired communication, radio communication, infrared communication, optical communication, fiber-optic communication, Wi-Fi or other wireless communication, and the Internet.

To improve accuracy of predicting a time at which bright, fast-moving objects will appear in the field of observation, and to improve identification accuracy, parameters known from databases of space objects and aircraft, for example the NORAD database, may be used. These parameters may be obtained by a receiver connected to such databases over a communication channel. An output of the receiver may be connected to device 16, in particular to an input of unit 7 for determining parameters of bright, fast-moving objects, within which the bright objects are identified by correlating parameters of objects from field 13 of observation of optical observation device 2 with parameters of objects from the database. As a result, recognition accuracy for such objects may be increased.

Units 5, 6, and 7 are elements of device 16 and may be combined in different configurations. In some embodiments, units 5, 6, and 7 may be combined into a single unit or device.

The method and apparatus described above may also be used to improve performance of telescopes deployed in outer space.

A distance between a space-based telescope and a bright, fast-moving object, such as a satellite, may be tens of kilometers. The impact of satellites passing in relative proximity to space-based telescopes, compared with their impact on ground-based telescopes, may be more rapid and significant.

In such a situation, to enable timely detection of a passing satellite and determination of its parameters, field 13 of observation of optical observation device 2 may be set to a maximum possible radius. If the radius of field 13 of observation of optical observation device 2 exceeds the radius of field 12 of observation of telescope 1 by more than 10 degrees, geometric distortions of the image in field 13 of observation may occur, which may significantly reduce accuracy in determining speed and direction of movement of the satellite.

When telescope 1 is deployed in outer space, device 16 may be mounted on telescope 1. A width of a trace left by a bright satellite in the field of observation of an optical observation device mounted on a space-based telescope may be tens or hundreds of pixels. This can cause loss of images of multiple guide stars. When there is a high risk that the space-based telescope will approach bright satellites, guide stars may be selected in advance from among stars whose images are least likely to be illuminated by bright satellites, thereby improving guiding accuracy. For this purpose, when star images are processed in device 16, stars not affected by satellites may be selected as guide stars based on known satellite trajectories. Parameters of these trajectories may be obtained, for example, in a format known as a Two-Line Element set (TLE), or other similar data, through a device for connecting to databases of space-object trajectories, including the NORAD database, databases of various Space Situational Awareness services, or other similar databases. Because a device can be used to select guide stars that are not affected by bright, fast-moving objects, guiding device 8 of space-based telescope 1 can be controlled with greater accuracy.

Using data obtained from a device connected to databases of space-object trajectories, stars whose images are not affected by trace 18 of a bright satellite may be selected as guide stars.

Similarly, a device for connecting to databases of space-object trajectories may improve operating efficiency of device 16, and of the method as a whole, when astronomical observations are performed by a ground-based telescope.

Radiation from bright objects that interferes with telescopes and their guiding systems may occur at various frequencies in the optical range. Radiation in the visible and infrared ranges may have the greatest impact. The described method and apparatus may be applied to protect against bright, fast-moving interference in any part of the optical range, including the visible and infrared ranges.

INDUSTRIAL APPLICABILITY

The method for ensuring operation of a telescope and the device for implementing the method may be used in existing astronomical observation systems, including professional and amateur observation systems.

Although embodiments have been described above, those skilled in the art will appreciate that various advantages of the described method and apparatus may be achieved.

It should also be appreciated that various modifications, adaptations, and alternative embodiments may be made without departing from the scope and spirit of the present invention. The invention is further defined by the following claims.

What is claimed is:

1. A method for ensuring an operation of a telescope, comprising:

in a presence of bright moving objects, determining a direction of the telescope's field of observation;

installing an optical observation device at the telescope with a radius of the field of observation that is one to ten degrees greater than a radius of a field of observation of the telescope;

registering the bright moving objects at an output of the optical observation device;

determining speed and direction of movement of the bright moving objects;

identifying registered objects whose speed and direction of movement indicate that they are stars;

using data about the registered objects identified as stars to guide the telescope and the optical observation device;

selecting objects from the bright moving objects whose speed and direction of movement indicate that they belong to a class of space and flying objects of artificial origin;

determining parameters of the selected objects; and using the parameters of the selected objects to reduce an effect of optical radiation from the selected objects on observation results of the telescope.

2. The method of claim 1, wherein the optical observation device is mounted on the telescope.

3. The method of claim 1, further comprising determining a location of the optical observation device and transmitting the location data to the telescope together with the parameters of the selected objects.

4. The method of claim 1, wherein a distance from the optical observation device to the telescope does not exceed 500 meters.

5. The method of claim 1, wherein the telescope is placed in space.

6. A device for implementing a method for ensuring an operation of a telescope in a presence of bright moving objects, comprising:

an image processor configured to receive image data from an optical observation device and determine parameters of bright objects represented in the image data;

a telescope-guiding controller configured to generate guiding signals for a telescope guiding device based on objects identified as stars; and an interference-reduction controller configured to determine parameters of selected bright moving objects belonging to a class of space and flying objects of artificial origin and to generate control information for reducing an effect of optical radiation from the selected bright moving objects on observation results of at least one telescope;

wherein an input of the telescope-guiding controller and an input of the interference-reduction controller are connected to an output of the image processor, and an input of the image processor is configured to be connected to an output of an optical observation device having a radius of a field of observation that is one to ten degrees greater than a radius of a field of observation of the telescope, an output of the telescope-guiding controller is configured to be connected to a telescope guiding device, and an output of the interference-reduction controller is configured to be connected to an input of an interference-reduction device configured to reduce an effect of optical radiation from the selected bright moving objects on observation results of the telescope.

7. The device of claim 6, further comprising a spatial location sensor.

8. The device of claim 6, wherein the device is configured to connect to databases of trajectories of space and flying objects.

9. A device for ensuring an operation of a telescope in a presence of bright moving objects, comprising:

an optical-observation interface configured to receive image data from an optical observation device having a field of observation directed toward a field of observation of the telescope and having a radius that is one to ten degrees greater than a radius of the field of observation of the telescope;

a processor coupled to the optical-observation interface and configured to determine, from the image data, speeds and directions of movement of bright moving objects represented in the image data;

wherein the processor is further configured to identify, based on the speeds and directions of movement, first registered objects as stars and second registered objects as space objects or flying objects of artificial origin;

a guiding output configured to provide guiding signals, generated using data associated with the first registered objects, to a telescope guiding device to guide the telescope and the optical observation device; and an interference-reduction output configured to provide, to an interference-reduction device, parameters of the second registered objects determined by the processor for reducing an effect of optical radiation from the second registered objects on observation results of the telescope.

10. The device of claim 9, wherein the optical observation device is mounted on the telescope.

11. The device of claim 9, further comprising a spatial location sensor configured to generate location data for the optical observation device.

12. The device of claim 11, wherein the interference-reduction output is configured to provide the location data with the parameters of the second registered objects.

13. The device of claim 9, wherein a distance between the optical observation device and the telescope does not exceed 500 meters.

14. The device of claim 9, wherein the processor is configured to determine brightness and movement parameters of the second registered objects.

15. The device of claim 9, wherein the interference-reduction device comprises a shutter or an optical filter configured to block light from reaching a photodetector matrix of the telescope.

16. The device of claim 9, wherein the interference-reduction output is configured to cause deactivation of a fragment of a photodetector matrix of the telescope during imaging.

17. The device of claim 9, wherein the processor is configured to control an observation schedule of the telescope based on the parameters of the second registered objects.

18. The device of claim 9, wherein the processor is configured to receive trajectory data from a database of space objects or flying objects and to identify the second registered objects by correlating the trajectory data with the speeds and directions of movement determined from the image data.

19. The device of claim 9, wherein the processor is configured to select guide stars from the first registered objects based on trajectory data of the second registered objects.

* * * * *